United States Patent
Dawkins

(10) Patent No.: US 8,171,216 B2
(45) Date of Patent: May 1, 2012

(54) SYSTEM AND METHOD FOR MANAGING DEVICES IN AN INFORMATION HANDLING SYSTEM

(75) Inventor: William P. Dawkins, Jonestown, TX (US)

(73) Assignee: Dell Products, LP, Round Rock, TX (US)

( * ) Notice: Subject to any disclaimer, the term of this patent is extended or adjusted under 35 U.S.C. 154(b) by 389 days.

(21) Appl. No.: 12/475,157

(22) Filed: May 29, 2009

(65) Prior Publication Data

US 2010/0306464 A1 Dec. 2, 2010

(51) Int. Cl.
*G06F 12/00* (2006.01)
*G06F 12/08* (2006.01)

(52) U.S. Cl. ............ 711/114; 711/202; 711/E12.001; 711/E12.002; 711/E12.078

(58) Field of Classification Search .................. None
See application file for complete search history.

(56) References Cited

U.S. PATENT DOCUMENTS

| | | | |
|---|---|---|---|
| 6,925,529 B2 | 8/2005 | Bohrer et al. | |
| 7,281,109 B2 | 10/2007 | Kano | |
| 7,404,102 B2 | 7/2008 | Soran et al. | |
| 7,441,096 B2 | 10/2008 | Kitamura | |
| 2002/0103965 A1 | 8/2002 | Dawkins et al. | |
| 2007/0208788 A1* | 9/2007 | Chakravarty et al. | 707/204 |
| 2007/0239747 A1* | 10/2007 | Pepper | 707/101 |
| 2008/0294846 A1 | 11/2008 | Bali et al. | |
| 2010/0199036 A1* | 8/2010 | Siewert et al. | 711/112 |

* cited by examiner

*Primary Examiner* — Denise Tran
(74) *Attorney, Agent, or Firm* — Larson Newman, LLP

(57) ABSTRACT

A method can include associating a bin access value with each data storage bin of a plurality of data storage bins after a current time window ends; mapping each data storage bin of the plurality of data storage bins to a storage tier of a hierarchy of storage tiers, based on the bin access value associated with the data storage bin, such that a bin access value associated with each data storage bin mapped to a storage tier is greater than or equal to a bin access value associated with each data storage bin mapped to a next highest-performing storage tier; causing data associated with each data storage bin of the plurality of data storage bins to be migrated to the storage tier to which the data storage bin is mapped; and, when a data storage bin was not mapped to a current storage tier after a previous time window ended, automatically determining a time weighting factor to be applied to an access frequency associated with a time window.

20 Claims, 4 Drawing Sheets

SYSTEM AND METHOD FOR MANAGING DEVICES IN AN INFORMATION HANDLING SYSTEM

FIELD OF THE DISCLOSURE

This disclosure relates generally to systems and methods used by information handling systems, and more particularly to systems and methods for managing stored data in information handling systems.

DESCRIPTION OF THE RELATED ART

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the invention.

Embodiments incorporating teachings of the present disclosure are illustrated and described with respect to the drawings presented herein.

DETAILED DESCRIPTION

Figure 1:
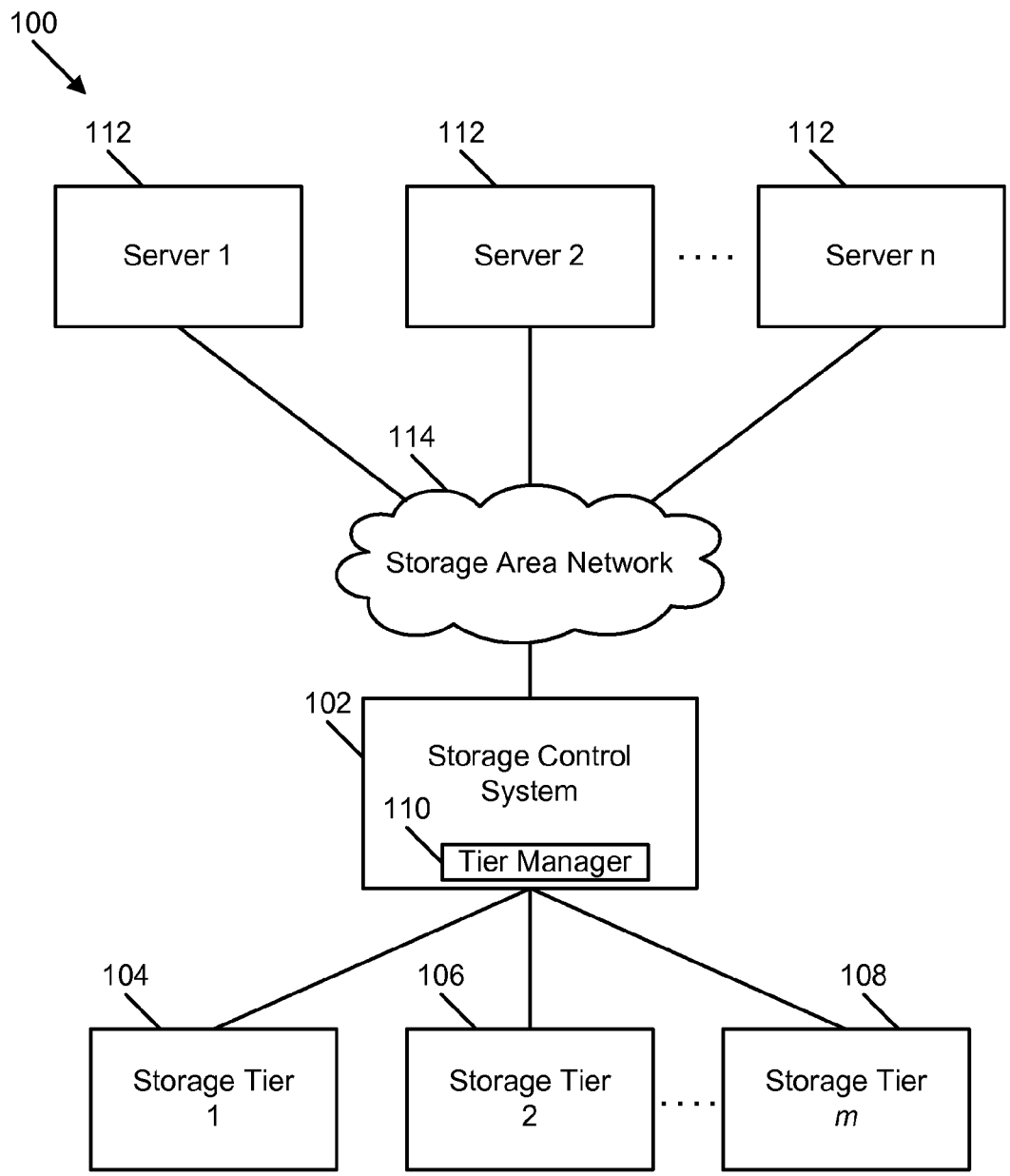
FIG. 1 is a block diagram illustrating an exemplary embodiment of a system to manage stored data.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random access memory, etc.), nonvolatile (read only memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices as well as various input and output (I/O) devices, such as a keyboard, a mouse, a video display, or any combination thereof. The information handling system can also include one or more buses operable to transmit communications between the various hardware components.

Although referred to as a "device," the device may be configured as hardware, firmware, software, or any combination thereof. For example, the device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

In the description below, a flow-charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes, " "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

FIG. 1 illustrates a particular embodiment of a system 100 to manage stored data. The system 100 includes a storage control system 102 that communicates with a plurality of storage tiers, such as a storage tier 104, another storage tier 106, and an additional storage tier m 108. The storage control system 102 can include a tier manager 110, which may include hardware, executable instructions, or any combination thereof, adapted to manage data stored via the storage tiers 104-108. In an illustrative embodiment, the storage control system 102 can communicate with a plurality of servers 112, other information handling systems, or any combination thereof, via a storage area network 114.

The storage tiers 104-108 can include logically separate storage tiers located at a single device; physically separate storage tiers distributed between or among a plurality of devices; or a combination thereof. Each storage tier includes a storage device having a memory portion. In one example, memory portions associated with a storage tier can be distributed between or among a plurality of storage devices. In another example, memory portions associated with a storage tier can be located at a single device. For instance, a storage tier can include a storage device having a plurality of logically separate memory portions, or a storage tier can include a single storage device having a single memory portion.

The storage tiers 104-108 are logically disposed in a data storage hierarchy, whereby "hottest" data (such as data that is accessed most frequently, with increasing frequency, or a combination thereof) is stored at a particular storage tier, such as the storage tier 104; whereby "coldest" data (such as data that is accessed least frequently, with decreasing frequency, or a combination thereof) is stored at another storage tier, such as the storage tier m 108; and whereby data that is neither hottest nor coldest is stored at an additional storage tier, such as the storage tier 106.

In an illustrative embodiment, the storage tiers 104-108 can be numbered to indicate their places in the data storage hierarchy. For instance, the storage tier 104 can be designated as a lowest numbered storage tier, such as a first storage tier, to indicate its superior place in the hierarchy. In an illustrative embodiment, the storage tier m 108 can be designated as a highest numbered storage tier to indicate its least place in the hierarchy. In another embodiment, a highest numbered storage tier can correspond to a superior place in the hierarchy, and a lowest numbered storage tier can correspond to a least place in the hierarchy.

In an illustrative embodiment, the storage tier that stores hottest data, such as the storage tier 104, can include a memory type having a fastest response rate, a most expensive memory type, a memory type having a least capacity, a memory type having a best performance characteristic, another property that contributes to its use for storing the hottest data, or any combination thereof, as compared to other memory types in the plurality of storage tiers 104-108. For instance, the storage tier 104 can include a solid-state drive (SSD), a flash drive included in a server (such as on a PCI bus or other bus), another storage device, or any combination thereof.

In another illustrative embodiment, the storage tiers 106 and 108 can include memory types that do not have a fastest response rate, memory types that are not a most expensive memory type, memory types that do not have a least capacity, memory types that do not have a best performance characteristic, other properties that contribute to their use for storing data other than the hottest data, or any combination thereof, as compared to other memory types in the plurality of storage tiers.

In one example, the storage tier that stores coldest data, such as the storage tier m 108, can include a storage device having a slowest response rate, a lowest cost, a greatest capacity, a worst performance characteristic, another property that contributes to its use for storing the coldest data, or any combination thereof. For instance, the storage tier 104 can include a serial ATA (SATA) storage device, other storage device or any combination thereof.

In another example, the storage tier that stores data that is not hottest or coldest, such as the storage tier 106 can include a storage device having a response rate that is not fastest or slowest, a cost that is not highest or lowest, a capacity that is not highest or lowest, a performance characteristic that is not best or worst, another property that contributes to its use for data that is not hottest or coldest, or any combination thereof. For instance, the storage tier 106 can include a serial attachment SCSI (SAS) storage device, other storage device or any combination thereof.

The storage control system 102 is adapted to receive requests from the servers 112 for data stored via the storage tiers 104-108, to send requested data to a requesting server, and to receive data from the servers 112 for storage via the storage tiers 104-108. The storage control system 102 can include a server or other information handling system having processing logic, such as a processor (not shown) and memory (not shown) accessible to the processing logic. The memory can store instructions that are readable and executable by the processing logic to perform functions related to managing stored data. Aspects of the storage control system 102 can be co-located, or the server control system 102 can have a distributed architecture. In one embodiment, the storage control system 102 can include a Redundant Array of Independent Disks (RAID) control system, another storage control system or any combination thereof.

Figure 2:
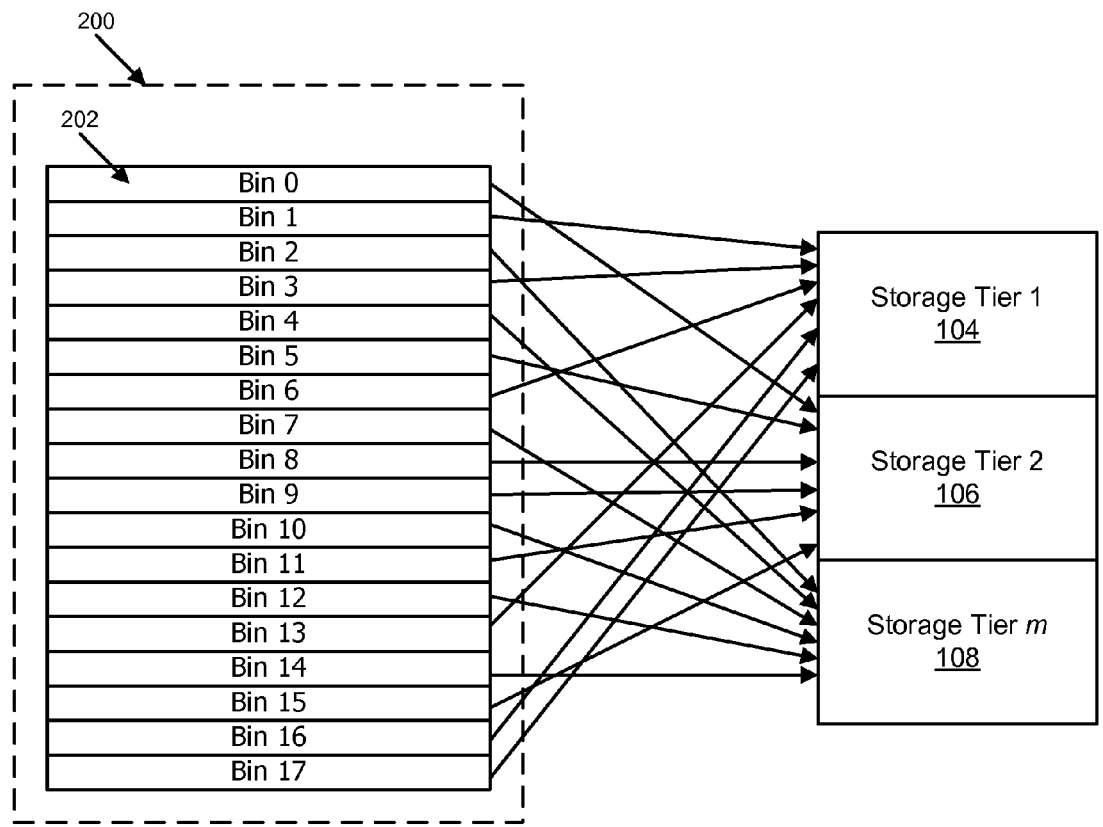
FIG. 2 is a diagram illustrating another exemplary embodiment of a system to manage stored data.

The tier manager 110 is adapted to divide a total memory space associated with the storage tiers 104-108, such as the memory space 200 illustrated in FIG. 2, into a plurality of data storage portions, such as data storage bins or pages. A memory address or other identifier can be associated with a data storage bin. In addition, the tier manager 110 can be adapted to set a time window length. The tier manager 110 is adapted to store information indicating an access frequency for a particular data storage bin (such as a number of times that the particular data storage bin is accessed) during a time window having the set length, such as a current time window, a previous time window, an additional time window before or after the current time window, or any combination thereof. Further, the tier manager 110 is adapted to map a particular data storage bin to a selected storage tier based on a time weighted access frequency related to the particular data storage bin. In an illustrative embodiment, a memory address of the particular data storage bin can be mapped to the selected storage tier. The tier manager 110 can be adapted to cause data from the particular data storage bin can be migrated to the selected storage tier.

In an illustrative embodiment, the tier manager 110 can be adapted to detect an access request related to a particular data storage bin of the plurality of data storage bins, such as the data storage bin illustrated at 202 in FIG. 2. The access request can include an input request, an output request, a read request, a write request, another access request, or any combination thereof. The tier manager 110 is adapted to make a record of the access request with respect to the particular data storage bin and with respect to a current time window during which the access request occurred.

Figure 3:
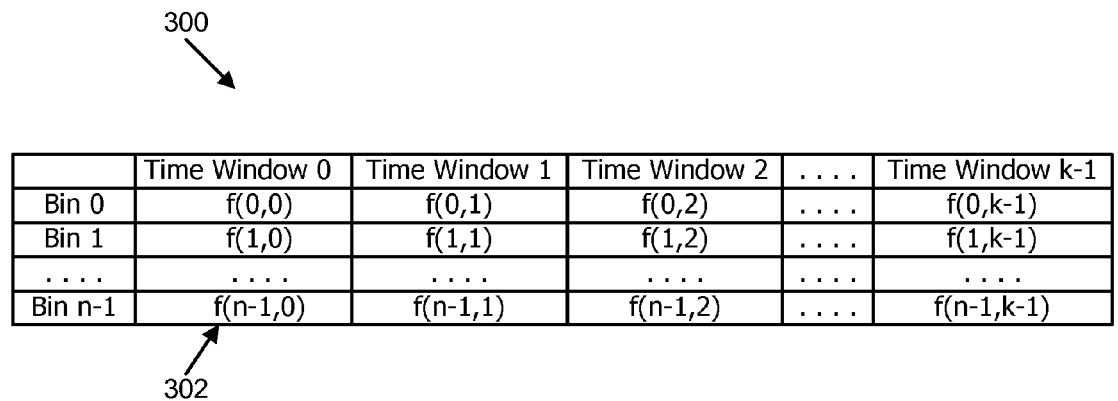
FIG. 3 is a diagram illustrating an exemplary embodiment of a window access table.

In an example, the tier manager 110 can be adapted to record access frequency information via an access table, such as the window access table (WAT) 300 illustrated in FIG. 3. The WAT 300 can include an access frequency f(n,k), for each data storage bin n of a plurality of data storage bins, during each time window k of a plurality of time windows. When recording an access request related to the particular data storage bin, the tier manager 110 can increment the access frequency counter f associated with the particular data storage bin and the current time window.

In an illustrative, non-limiting embodiment, a size of the WAT 300 in columns and rows can depend on an amount of memory, processing power, or a combination thereof, associated with or allocated to the WAT 300 by the tier manager 110, the storage control system 102, or a combination thereof. A number of data storage bins for which access frequency data is stored by the tier manager 110 can depend on a number of rows (or columns) of the WAT 300. The tier manager 110 can be adapted to divide the total memory space of the storage tiers 104-108 into a plurality of data storage bins based on the number of columns or rows of the WAT 300 that correspond to the data storage bins.

Additionally, a number of time windows for which access frequency data is stored by the tier manager 110 can depend on a number of columns (or rows) of the WAT 300. The tier manager 110 or a system designer can set the length of a time window based on the number of columns or rows in the WAT 300 that correspond to the plurality of time windows; based on processing power available to perform a particular function of the tier manager 110 with respect to managing stored data; or any combination thereof. Setting a time window length is discussed further below. In a particular embodiment, the WAT 300 can be restructured after a time window has ended, such that data in a column 302 includes access frequency information for the plurality of data storage bins during a current time window.

After the current time window ends, the tier manager 110 is adapted to associate a bin access value with the particular data storage bin, with another data storage bin in the plurality of data storage bins, or any combination thereof. In one embodiment, the tier manager 110 can be adapted to associate a separate bin access value with each of the plurality of data storage bins. A bin access value represents a time-weighted frequency with which a data storage bin has been accessed during the current time window, a previous time window, an additional time window prior to the current time window, or any combination thereof. A time weighting factor can be associated with a time window, such that the bin access value represents, for example, an increase or decrease in the frequency with which data stored in the data storage bin is accessed over time (such as whether the data is becoming "hotter" or "colder"). A time weighting factor can equal one or another integer or non-integer greater than or less than one.

In one example, a bin access value for a data storage bin x after a time window 0 ends can be represented by:

$$bav(x)=f(x,0)+\text{alpha}*f(x,1)+\text{beta}*f(x,2)+\ldots+\text{gamma}*f(x,y).$$

In this example, f(x,0) represents a number of access requests detected with respect to a data storage bin x during the current time window 0. Similarly, f(x,1) represents a number of access requests detected with respect to the particular data storage bin x during a previous time window 1. Further, f(x,2)...f(x,y) represent numbers of access requests detected with respect to the particular data storage bin x during the additional time windows 2 ... y, which precede the current time window. Additionally, alpha, beta and gamma are time weighting factors associated with time windows 1, 2 and y, respectively. Time weighting factors can also be applied to other time windows.

The tier manager 110 is adapted to map the particular data storage bin to a selected storage tier of the plurality of storage tiers 104-108 based on the bin access value associated with the particular data storage bin. In a particular embodiment, the tier manager 110 can be adapted to map a plurality of data storage bins among the plurality of storage tiers 104-108 based on bin access values associated with each data storage bin, after the current time window has ended. The tier manager 110 can be adapted to cause data to be migrated among the storage tiers 104-108, based on bin access values for the plurality of storage bins, until the following is true: for an m-tier storage system, where a lower value of m indicates a storage tier storing "hotter" data, the bin access value for each data storage bin associated with storage tier m is greater than or equal to the bin access value for a most frequently accessed data storage bin associated with storage tier m+1.

In one embodiment, the tier manager 110 can be adapted to sort the plurality of data storage bins according to their current bin access values. For example, the tier manager can sort the data storage bins from highest current bin access value to lowest current bin access value. The tier manager 110 is adapted to map the data storage bins to a plurality of storage tiers, such that a current bin access value of each bin associated with a particular storage tier is higher than a current bin access value of each data storage bin associated with a next lowest storage tier.

In an example, the tier manager 110 can be adapted to map data storage bins having highest current bin access values to a first storage tier until a remaining storage capacity of the first storage tier is too small for any further data storage bins to be mapped to the first storage tier. The tier manager 110 can be adapted to then map data storage bins having highest remaining current bin access values to a next storage tier until a remaining storage capacity of the next storage tier is too small for any further data storage bins to be mapped to the next storage tier, and so on.

In another embodiment, a range of bin access values can be associated with each of the plurality of storage tiers. For example, a highest range of bin access values can be associated with the storage tier 104, such that data that is most frequently accessed, accessed with increasing frequency, or a combination thereof, is stored at memory included in the storage tier 104. If the bin access value associated with the particular data storage bin is within the highest range of bin access values, the tier manager 110 can be adapted to map the particular data storage bin to the storage tier 104.

In another example, a lowest range of bin access values can be associated with the storage tier 108, such that data that is least frequently accessed, accessed with decreasing frequency, or a combination thereof, is stored at memory included in the storage tier 108. If the bin access value associated with the particular data storage bin is within the lowest range of bin access values, the tier manager 110 is adapted to map the particular data storage bin to the storage tier m 108.

In a further example, another range of bin access values, such as an intermediate range of bin access values, can be associated with the storage tier 106, such that data that is neither most frequently accessed nor least frequently accessed is stored at memory included in the storage tier 106. If the bin access value associated with the particular data storage bin is within the other range of bin access values, the tier manager 110 is adapted to map the particular data storage bin to the storage tier 106.

The tier manager 110, the storage control system 102, or a combination thereof, is adapted to cause data stored in each of the plurality of data storage bins to be stored at memory associated with the selected storage tier to which the particular data storage bin has been mapped. For instance, if the data storage bin 202 illustrated in FIG. 2 is mapped to the storage tier 104, the tier manager 110 can cause data stored in the data storage bin 202 to be migrated to an SSD or other memory associated with the storage tier 104.

In a particular embodiment, the tier manager 110 can be adapted to automatically determine whether to change a time weighting factor that is applied to an access frequency associated with a particular time window, when determining a bin access value. For example, a particular data storage bin can be mapped to the storage tier 104 based on a bin access value after a current time window has ended, whereas the particular data storage bin was mapped to a storage tier other than the storage tier 104 after a previous time window ended. In this example, the tier manager 110 can be adapted to determine whether applying a new time weighting factor to an access frequency associated with a particular time window would have caused the tier manager 110 to map the particular data storage bin to the storage tier 104 after the previous time window ended, such that data associated with the particular data storage bin would not have been migrated after the current time window ended.

In an illustrative embodiment, the formula $$bav(x)=f(x,0)+alpha*f(x,1)+beta*f(x,2)+\ldots+gamma*f(x,y)$$

can be used to determine the current bin access value for a data storage bin x, using access frequency information for a plurality of time windows that include a current time window, 0, a previous time window, 1, and additional time windows, 2...y. The current bin access value can cause the tier manager 110 to map the data storage bin x to the storage tier 104.

In addition, the formula $$bav(x)=f(x,1)+alpha*f(x,2)+beta*f(x,3)+\ldots+gamma*f(x,y+1)$$

can be used to determine the previous bin access value for the data storage bin x, using access frequency information for a plurality of time windows including the previous time window, 1, and additional time windows, 2...y. The previous bin access value can cause the tier manager 110 to map the data storage bin x to the storage tier 106.

The tier manager 110 can be adapted to determine whether changing a time weighting factor (such as alpha, beta, gamma, another time weighting factor, or any combination thereof) to a new time weighting factor would have caused the tier manager 110 to map the data storage bin x to the storage tier 104, instead of storage tier 106, after the previous time window ended. If so, the tier manager 110 can be adapted to change the time weighting factor to the new time weighting factor. The tier manager 110 can be adapted to apply the new time weighting factor to a time window when determining a bin access value associated with the data storage bin x after a next time window has ended. Conversely, if the new time weighting factor would not have caused the tier manager 110 to map the data storage bin x to the storage tier 104, the tier manager 110 can be adapted to not use the new time weighting factor.

In one embodiment, the tier manager 110 can be adapted to change a time weighting factor applied to an access frequency associated with a time window, after determining that a threshold number of data storage bins were mapped to different storage tiers after the current time window ended, as compared to after the previous time window ended; after determining that a certain number of the newly mapped data storage bins would have been mapped to their current storage tiers after the previous time window ended; or any combination thereof. In another embodiment, the tier manager 110 can be adapted to change a time weighting factor applied to an access frequency associated with a time window, after determining that a threshold number of data storage bins were mapped to a highest performing storage tier, such as storage tier 104, after the current time window ended, but were not mapped to the storage tier 104 after the previous time window ended.

In one example, the tier manager 110 can be adapted to recalculate the previous bin access value for each data storage bin using a pre-defined set of weighting factors, when a threshold number of data storage bins were mapped to a different storage tier after the current time window ended, as compared to after the previous time window ended. The tier manager 110 can be adapted to determine whether the pre-defined set of weighting factors would have caused the tier manager 110 to map a certain number of such newly mapped data storage bins to their current storage tiers after the previous time window ended.

For instance, the tier manager 110 can recalculate a previous bin access value for each data storage bin using the following sets of weighting factors:

Set 1: alpha=0.75; beta=$(0.75)^2$; . . . gamma=$(0.75)^y$
Set 2: alpha=0.5; beta=$(0.5)^2$; . . . gamma=$(0.5)^y$
Set 3: alpha=0.25; beta=$(0.25)^2$; . . . gamma=$(0.25)^y$ Those skilled in the art will recognize that other sets of weighting factors, including sets having weighting factors unrelated to each other, to a time window, or any combination thereof, can be used to recalculate the previous bin access value.

The tier manager 110 can determine a number of data storage bins that would have been mapped to a new storage tier after the current time window ended if the pre-defined set of weighting factors had been applied after the previous time window ended. The tier manager 110 can compare that number to a number of data storage bins that actually were mapped to a new storage tier after the current time window ended. If the tier manager 110 determines that applying the pre-defined set of time weighting factors after the previous time window ended would have caused a threshold reduction in the number of data storage bins mapped to a different storage tier after the current time window ended, the tier manager 110 can be adapted to apply the pre-defined set of time weighting factors when determining bin access values for the data storage bins after a next time window (such as a time window that succeeds the current time window) has ended.

As stated previously, the tier manager 110 or a system designer can set a time window length. The length of a time window can be set long enough that the storage control system 102 can move data stored in data storage bins among storage tiers 104-108 while still satisfying access requests of clients, such as the servers 112. For instance, where the tier manager 110 initiates movement of data stored in data storage bins between storage tiers at time window boundaries, the time window length can be set long enough so that the movement dictated by the tier manager 110 will be completed before the current time window ends. In such an embodiment, the minimum time window length can be governed by the physical capabilities of the system, whereas the maximum time window length can be set so that the tier manager 110 can appropriately detect changes in the access patterns of data storage bins. If a time window length is too long, for example, the tier manager 110 may not respond quickly when a "hot" bin suddenly becomes "cold" and will continue to associate the data storage bin with the highest performing storage tier longer than needed. Time window lengths of various systems could be on the order of seconds, minutes, hours or other time units.

Figure 4:
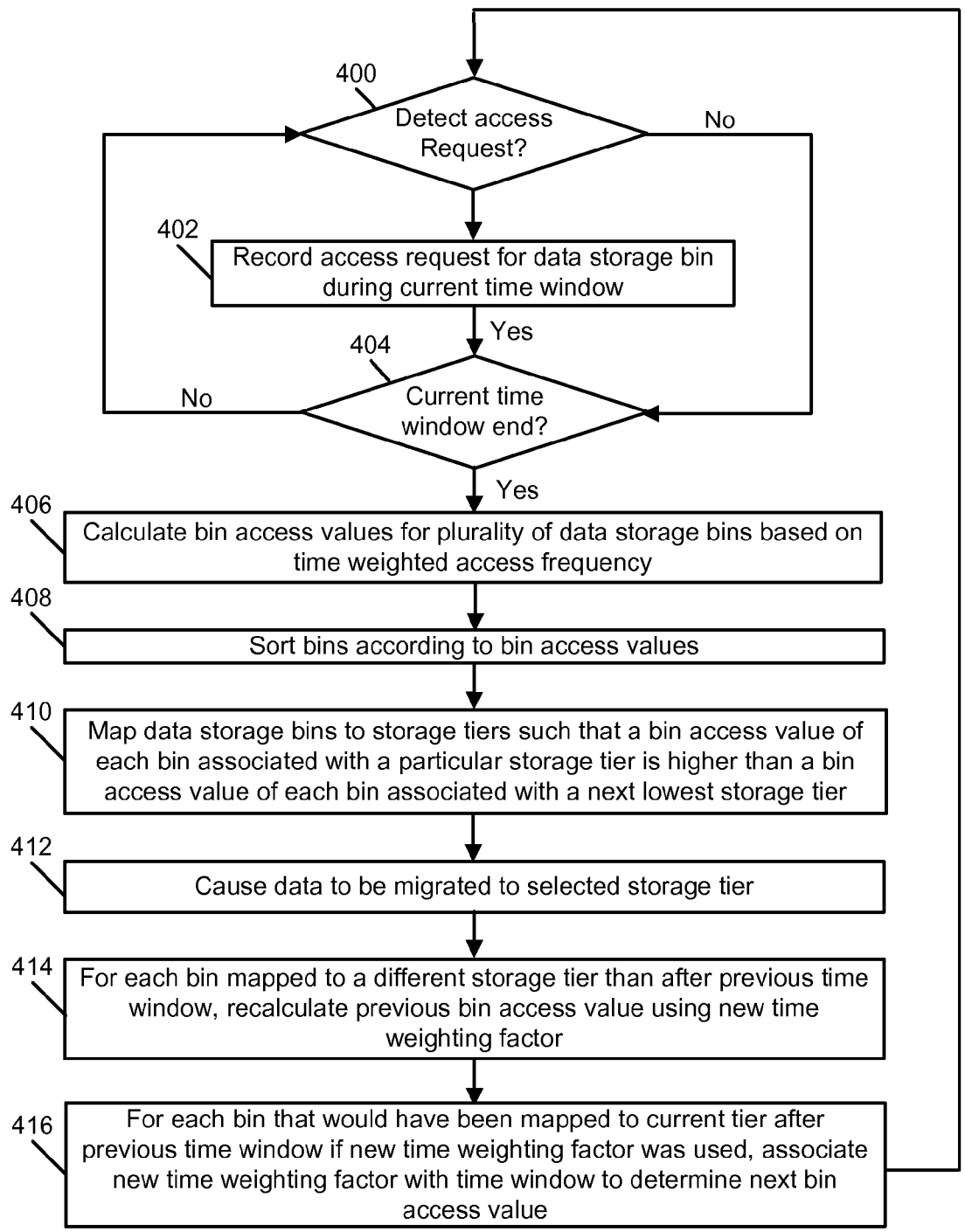
FIG. 4 is a flow diagram illustrating an exemplary embodiment of a method of managing stored data.

FIG. 4 illustrates a method of managing stored data. At decision node 400, a tier manager determines whether it has detected an access request related to a particular data storage bin. If the tier manager does not detect an access request, the method proceeds to decision node 404. On the other hand, if the tier manager detects an access request, the method moves to block 402, and the tier manager makes a record of the access request with respect to the particular data storage bin and a current time window during which the access request is received. In an illustrative embodiment, the tier manager can increment an access frequency counter associated with the data storage bin and the current time window in an access table, such as the WAT 300 illustrated in FIG. 3.

Proceeding to decision node 404, the tier manager determines whether the current time window has ended. If the current time window has not ended, the method returns to decision node 400. Conversely, if the current time window has ended, the method continues to block 406, and the tier manager calculates a current bin access value for each of a plurality of data storage bins, including the particular data storage bin, based on an access frequency related to each of the plurality of data storage bins during the current time window, a previous time window, and additional time window prior to the current time window, or any combination thereof. In an illustrative embodiment, a time weighting factor equal to one or another number can be associated with a time window.

Advancing to block 408, the tier manager sorts the data storage bins according to the current bin access value associated with each data storage bin. For example, the tier manager can sort the data storage bins from highest current bin access value to lowest current bin access value. At block 410, the tier manager maps the data storage bins to a plurality of storage tiers, such that a current bin access value of each bin associated with a particular storage tier is higher than a current bin access value of each data storage bin associated with a next lowest storage tier. In one example, the tier manager can map data storage bins having highest current bin access values to a first storage tier until a remaining storage capacity of the first storage tier is too small for any further data storage bins to be mapped to the first storage tier. Then the tier manager can map data storage bins having highest remaining current bin access values to a next storage tier until a remaining storage capacity of the next storage tier is too small for any further data storage bins to be mapped to the next storage tier, and so on.

Moving to block 412, the tier manager causes data associated with each data storage bin to be migrated to memory associated with a storage tier to which the data storage bin was mapped at block 410. Proceeding to block 414, for each data storage bin mapped to a different storage tier after a previous time window, than after the current time window, the tier manager recalculates a previous bin access value related to the particular data storage bin using a new time weighting factor. In a particular embodiment, the new weight can be included in a pre-defined set of weights used by the tier manager to recalculate the previous bin access value.

Continuing to decision node 416, for each data storage bin that would have been mapped to its current storage tier after the previous time window, if the new time weighting factor had been used to calculate its bin access value, the tier manager applies the new time weighting factor when calculating a next bin access value for the data storage bin.

In some embodiments, the methods disclosed herein can be performed as described. In other embodiments, certain aspects of the methods can be performed in alternative sequences or simultaneously.

Many different aspects and embodiments are possible. Some of those aspects and embodiments are described below. After reading this specification, skilled artisans will appreciate that those aspects and embodiments are only illustrative and do not limit the scope of the present invention.

According to a first aspect, a method can include associating a bin access value with each data storage bin of a plurality of data storage bins after a current time window ends. The bin access value corresponds to a time-weighted access frequency related to the data storage bin. The method can also include mapping each data storage bin of the plurality of data storage bins to a storage tier of a hierarchy of storage tiers, based on the bin access value associated with the data storage bin, such that a bin access value associated with each data storage bin mapped to a storage tier is greater than or equal to a bin access value associated with each data storage bin mapped to a next highest-performing storage tier. Further, the method can include causing data associated with each data storage bin of the plurality of data storage bins to be migrated to the storage tier to which the data storage bin is mapped. The method can also include, when a data storage bin was not mapped to a current storage tier after a previous time window ended, automatically determining a time weighting factor to be applied to an access frequency associated with a time window. A next bin access value associated with the data storage bin is calculated using the determined time weighting factor.

In an embodiment of the first aspect, the method can include detecting an access request related to the data storage bin during the current time window and incrementing an access frequency counter associated with the data storage bin and with the current time window. The bin access value can be calculated based on the value of the access frequency counter after the current time window has ended.

In another embodiment of the first aspect, the bin access value can be based on a value of another access frequency counter associated with the previous time window, on another time weighting factor associated with the previous time window, on a value of an additional access frequency counter associated with an additional time window prior to the current time window, on an additional time weighting factor associated with the additional time window, or any combination thereof.

In a further embodiment of the first aspect, the method can include recalculating a previous bin access value associated with the data storage bin using the new time weighting factor. The method can further comprise applying the new time weighting factor when the recalculated previous bin access value would have caused the data storage bin to be mapped to the current storage tier after the previous time window ended.

In yet another embodiment of the first aspect, the method can include calculating a plurality of recalculated previous bin access values for the data storage bin, based on a plurality of pre-defined time weighting factor sets, and selecting a particular pre-defined time weighting factor set after determining that the recalculated previous bin access value corresponding to the selected pre-defined time weighting factor set would have caused the data storage bin to be mapped to the current storage tier after the previous time window ended. The particular pre-defined time weighting factor set includes the new time weighting factor.

In still another embodiment of the first aspect, data accessed most frequently, with increasing frequency, or any combination thereof, is stored at a highest performing storage tier of the hierarchy of storage tiers.

In another embodiment of the first aspect, the highest-performing storage tier includes a fastest memory type of memory types in the hierarchy of storage tiers, a most expensive memory type of memory types in the hierarchy of storage tiers, a memory type having a least capacity of memory types in the hierarchy of storage tiers, or any combination thereof.

In an additional embodiment of the first aspect, the method can include determining that a threshold number of data storage bins were mapped to a different storage tier after the current time window ended, as compared to after the previous time window ended, before determining the new weighting factor. In still another embodiment of the first aspect, the method can include determining that a threshold number of data storage bins would not have been mapped to a different storage tier after the current time window ended, if the new weighting factor had been applied after the previous time window ended, before applying the new weighting factor after a next time window has ended.

According to a second aspect, a system can include a storage control system including a tier manager. The tier manager can be adapted to associate a bin access value with each data storage bin of a plurality of data storage bins after a current time window ends, wherein the bin access value corresponds to a time-weighted access frequency related to the data storage bin. The tier manager can also be adapted to map each data storage bin of the plurality of data storage bins to a storage tier of a hierarchy of storage tiers, based on the bin access value associated with the data storage bin, such that a bin access value associated with each data storage bin mapped to a storage tier is greater than or equal to a bin access value associated with each data storage bin mapped to a next highest-performing storage tier. Further, the tier manager can be adapted to cause data associated with each data storage bin of the plurality of data storage bins to be migrated to the storage tier to which the data storage bin is mapped. The tier manager can also be adapted to, when a data storage bin was not mapped to a current storage tier after a previous time window ended, automatically determine a time weighting factor to be applied to an access frequency associated with a time window, wherein a next bin access value associated with the data storage bin is calculated using the determined time weighting factor.

In an embodiment of the second aspect, the tier manager, the storage control system, or a combination thereof, is adapted to cause data associated with each data storage bin to be stored at memory associated with a storage tier to which the data storage bin is mapped.

In another embodiment of the second aspect, memory portions associated with the plurality of storage tiers are located at different physical devices. Alternatively, memory portions associated with the plurality of storage tiers can be located at a single physical device.

In a further embodiment of the second aspect, the tier manager is adapted to divide a total memory space of the hierarchy of storage tiers into a plurality of data storage bins identified by a plurality of memory addresses, and wherein the tier manager is adapted to map a memory address of each data storage bin to a storage tier.

In yet another embodiment of the second aspect, the tier manager can be adapted to record numbers of access requests for the plurality of data storage bins during a plurality of time windows via a window access table and to determine a number of the plurality of data storage bins based on a number of rows or columns of the window access table.

In still another embodiment of the second aspect, the plurality of storage tiers can include a solid state drive (SSD) storage device, a serial attached SCSI (SAS) storage device, a serial ATA (SATA) storage device, or any combination thereof. In another embodiment of the second aspect, the storage control system can include a Redundant Array of Independent Disks (RAID) control system.

According to a third aspect, a computer-readable medium can include processor-readable instructions that are executable by a processor to perform a method that can include associating a bin access value with each data storage bin of a plurality of data storage bins after a current time window ends, wherein the bin access value corresponds to a time-weighted access frequency related to the data storage bin; mapping each data storage bin of the plurality of data storage bins to a storage tier of a hierarchy of storage tiers, based on the bin access value associated with the data storage bin, such that a bin access value associated with each data storage bin mapped to a storage tier is greater than or equal to a bin access value associated with each data storage bin mapped to a next highest-performing storage tier; causing data associated with each data storage bin of the plurality of data storage bins to be migrated to the storage tier to which the data storage bin is mapped; and when a data storage bin was not mapped to a current storage tier after a previous time window ended, automatically determining a time weighting factor to be applied to an access frequency associated with a time window, wherein a next bin access value associated with the data storage bin is calculated using the determined time weighting factor.

In an embodiment of the third aspect, the determined time weighting factor is the same as a time weighting factor that was applied after the current time window, after the previous time window, or any combination thereof. In another embodiment of the third aspect, the determined time weighting factor is different from a time weighting factor that was applied after the current time window, after the previous time window, or any combination thereof.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing stored data, the method comprising:
    associating a bin access value with each data storage bin of a plurality of data storage hardware bins after a current time window ends, wherein the bin access value corresponds to a time-weighted access frequency related to the data storage bin;
    mapping each data storage bin of the plurality of data storage bins to a storage tier of a hierarchy of storage tiers, based on the bin access value associated with the data storage bin, such that a bin access value associated with each data storage bin mapped to a storage tier is greater than or equal to a bin access value associated with a most frequently accessed data storage bin mapped to a next highest-performing storage tier;
    causing data associated with each data storage bin of the plurality of data storage bins to be migrated to the storage tier to which the data storage bin is mapped; and
    when a data storage bin was not mapped to a current storage tier after a previous time window ended, automatically determining a time weighting factor to be applied to an access frequency associated with a time window, wherein a next bin access value associated with the data storage bin is calculated using the determined time weighting factor.

2. The method of claim 1, further comprising detecting an access request related to the data storage bin during the current time window and incrementing an access frequency counter associated with the data storage bin and with the current time window, wherein the bin access value is calculated based on the value of the access frequency counter after the current time window has ended.

3. The method of claim 2, wherein the bin access value is based on a value of another access frequency counter associated with the previous time window, on another time weighting factor associated with the previous time window, on a value of an additional access frequency counter associated with an additional time window prior to the current time window, on an additional time weighting factor associated with the additional time window, or any combination thereof.

4. The method of claim 1, wherein the new time weighting factor is determined by recalculating a previous bin access value associated with the data storage bin using the new time weighting factor, and wherein the method further comprises applying the new time weighting factor when the recalculated previous bin access value would have caused the data storage bin to be mapped to the current storage tier after the previous time window ended.

5. The method of claim 4, further comprising:
    calculating a plurality of recalculated previous bin access values for the data storage bin, based on a plurality of pre-defined time weighting factor sets; and
    selecting a particular pre-defined time weighting factor set after determining that the recalculated previous bin access value corresponding to the selected pre-defined time weighting factor set would have caused the data storage bin to be mapped to the current storage tier after the previous time window ended;

wherein the particular pre-defined time weighting factor set includes the new time weighting factor.

6. The method of claim 1, wherein data accessed most frequently, with increasing frequency, or any combination thereof, is stored at a highest performing storage tier of the hierarchy of storage tiers.

7. The method of claim 6, wherein the highest-performing storage tier includes a fastest memory type of memory types in the hierarchy of storage tiers, a most expensive memory type of memory types in the hierarchy of storage tiers, a memory type having a least capacity of memory types in the hierarchy of storage tiers, or any combination thereof.

8. The method of claim 1, further comprising determining that a threshold number of data storage bins were mapped to a different storage tier after the current time window ended, as compared to after the previous time window ended, before determining the new weighting factor.

9. The method of claim 1, further comprising determining that a threshold number of data storage bins would not have been mapped to a different storage tier after the current time window ended, if the new weighting factor had been applied after the previous time window ended, before applying the new weighting factor after a next time window has ended.

10. A system, comprising:
a storage control hardware system including a tier manager, wherein the tier manager is adapted to:
associate a bin access value with each data storage bin of a plurality of data storage bins after a current time window ends, wherein the bin access value corresponds to a time-weighted access frequency related to the data storage bin;
map each data storage bin of the plurality of data storage bins to a storage tier of a hierarchy of storage tiers, based on the bin access value associated with the data storage bin, such that a bin access value associated with each data storage bin mapped to a storage tier is greater than or equal to a bin access value associated with a most frequently accessed data storage bin mapped to a next highest-performing storage tier;
cause data associated with each data storage bin of the plurality of data storage bins to be migrated to the storage tier to which the data storage bin is mapped; and
when a data storage bin was not mapped to a current storage tier after a previous time window ended, automatically determine a time weighting factor to be applied to an access frequency associated with a time window, wherein a next bin access value associated with the data storage bin is calculated using the determined time weighting factor.

11. The system of claim 10, wherein the tier manager, the storage control system, or a combination thereof, is adapted to cause data associated with each data storage bin to be stored at memory associated with a storage tier to which the data storage bin is mapped.

12. The method of claim 10, wherein memory portions associated with the plurality of storage tiers are located at different physical devices.

13. The method of claim 10, wherein memory portions associated with the plurality of storage tiers are located at a single physical device.

14. The system of claim 10, wherein the tier manager is adapted to divide a total memory space of the hierarchy of storage tiers into a plurality of data storage bins identified by a plurality of memory addresses, and wherein the tier manager is adapted to map a memory address of each data storage bin to a storage tier.

15. The system of claim 10, wherein the tier manager is adapted to record numbers of access requests for the plurality of data storage bins during a plurality of time windows via a window access table and to determine a number of the plurality of data storage bins based on a number of rows or columns of the window access table.

16. The system of claim 10, wherein the plurality of storage tiers includes a solid state drive (SSD) storage device, a serial attached SCSI (SAS) storage device, a serial ATA (SATA) storage device, or any combination thereof.

17. The system of claim 10, wherein the storage control system includes a Redundant Array of Independent Disks (RAID) control system.

18. A non-transitory computer-readable medium including processor-readable instructions that are executable by a processor to perform a method, the method comprising:
associating a bin access value with each data storage bin of a plurality of data storage bins after a current time window ends, wherein the bin access value corresponds to a time-weighted access frequency related to the data storage bin;
mapping each data storage bin of the plurality of data storage bins to a storage tier of a hierarchy of storage tiers, based on the bin access value associated with the data storage bin, such that a bin access value associated with each data storage bin mapped to a storage tier is greater than or equal to a bin access value associated with a most frequently accessed data storage bin mapped to a next highest-performing storage tier;
causing data associated with each data storage bin of the plurality of data storage bins to be migrated to the storage tier to which the data storage bin is mapped; and
when a data storage bin was not mapped to a current storage tier after a previous time window ended, automatically determining a time weighting factor to be applied to an access frequency associated with a time window, wherein a next bin access value associated with the data storage bin is calculated using the determined time weighting factor.

19. The non-transitory computer-readable medium of claim 18, wherein the determined time weighting factor is the same as a time weighting factor that was applied after the current time window, after the previous time window, or any combination thereof.

20. The non-transitory computer-readable medium of claim 18, wherein the determined time weighting factor is different from a time weighting factor that was applied after the current time window, after the previous time window, or any combination thereof.

* * * * *

UNITED STATES PATENT AND TRADEMARK OFFICE
CERTIFICATE OF CORRECTION

PATENT NO. : 8,171,216 B2  
APPLICATION NO. : 12/475157  
DATED : May 1, 2012  
INVENTOR(S) : William P. Dawkins Page 1 of 1

It is certified that error appears in the above-identified patent and that said Letters Patent is hereby corrected as shown below:

On the Title Page, Item (54) and Column 1, lines 1-3, please amend the title to read "SYSTEM AND METHOD FOR MANAGING DEVICES IN AN INFORMATION HANDLING SYSTEM STORED DATA"

Signed and Sealed this
Twelfth Day of March, 2013

Teresa Stanek Rea
*Acting Director of the United States Patent and Trademark Office*